US010977207B2

(12) United States Patent
Apte et al.

(10) Patent No.: US 10,977,207 B2
(45) Date of Patent: *Apr. 13, 2021

(54) DYNAMIC ASSOCIATION OF APPLICATION WORKLOAD TIERS TO INFRASTRUCTURE ELEMENTS IN A CLOUD COMPUTING ENVIRONMENT

(71) Applicant: International Business Machines Corporation, Armonk, NY (US)

(72) Inventors: Ajay A. Apte, Austin, TX (US); Roy F. Brabson, Raleigh, NC (US); Orvalle T. Kirby, III, Raleigh, NC (US); Jason R. McGee, Apex, NC (US); Scott C. Moonen, Holly Springs, NC (US); Donald R. Woods, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 16/153,725

(22) Filed: Oct. 6, 2018

(65) Prior Publication Data

US 2019/0042528 A1 Feb. 7, 2019

Related U.S. Application Data

(63) Continuation of application No. 14/841,035, filed on Aug. 31, 2015, now Pat. No. 10,095,656, which is a (Continued)

(51) Int. Cl.
*G06F 15/173* (2006.01)
*H04L 29/08* (2006.01)
(Continued)

(52) U.S. Cl.
CPC .......... *G06F 15/17362* (2013.01); *G06F 8/61* (2013.01); *G06F 8/71* (2013.01);
(Continued)

(58) Field of Classification Search
None
See application file for complete search history.

(56) References Cited

U.S. PATENT DOCUMENTS

| 6,513,059 B1 | 1/2003 | Gupta |
| 7,103,647 B2 | 9/2006 | Aziz |

(Continued)

FOREIGN PATENT DOCUMENTS

| WO | WO-2009082387 A1 * | 7/2009 | ............. G06Q 10/06 |
| WO | WO 20113049074 | 4/2013 | |

OTHER PUBLICATIONS

K. Levanti and A. Ranganathan, "Planning-based configuration and management of distributed systems," 2009 IFIP/IEEE International Symposium on Integrated Network Management, Long Island, NY, 2009, pp. 65-72, doi: 10.1109/INM.2009.5188788. (Year: 2009).*

(Continued)

*Primary Examiner* — Abu Zar Ghaffari
(74) *Attorney, Agent, or Firm* — Mark Bergner

(57) ABSTRACT

Components are dynamically associated in a multi-tier application to different layers of a corresponding multi-tier application infrastructure. This includes defining, in a memory of a host computing system, a pattern that has an inventory of components of a multi-tier application. Each of the components are associated with a corresponding tier label for an n-tier architecture and the pattern is loaded into a pattern engine. The pattern engine deploys each component of the pattern to a layer of the n-tier architecture corresponding to a tier label associated with the component.

6 Claims, 2 Drawing Sheets

Related U.S. Application Data continuation of application No. 14/572,252, filed on Dec. 16, 2014, now Pat. No. 10,078,619.

(51) Int. Cl.
  *G06F 9/50* (2006.01)
  *G06F 8/71* (2018.01)
  *G06F 9/445* (2018.01)
  *G06F 8/61* (2018.01)
  *H04L 12/24* (2006.01)
  *G06F 9/455* (2018.01)

(52) U.S. Cl.
  CPC ........ *G06F 9/44521* (2013.01); *G06F 9/5072* (2013.01); *H04L 41/0873* (2013.01); *H04L 41/0886* (2013.01); *H04L 41/5054* (2013.01); *H04L 67/28* (2013.01); *G06F 9/45558* (2013.01); *H04L 41/5096* (2013.01)

(56) References Cited

U.S. PATENT DOCUMENTS

| | | |
|---|---|---|
| 7,124,398 B2 | 10/2006 | Chen |
| 7,165,194 B2 | 1/2007 | Paradkar |
| 7,337,184 B1 * | 2/2008 | Or .................. G06F 16/252 |
| 7,496,594 B1 | 2/2009 | Cummings |
| 7,610,293 B2 | 10/2009 | Vedula |
| 7,698,398 B1 | 4/2010 | Lai |
| 7,860,968 B2 | 12/2010 | Bornhoevd et al. |
| 7,890,543 B2 | 2/2011 | Hunt |
| 8,595,331 B2 | 11/2013 | Henseler et al. |
| 8,595,724 B2 | 11/2013 | Arcese |
| 8,600,814 B2 | 12/2013 | Dubnicki |
| 8,762,931 B2 | 6/2014 | Vidal |
| 9,047,133 B2 | 6/2015 | Winterfeldt |
| 9,098,310 B2 | 8/2015 | Ranganathan |
| 9,098,346 B2 | 8/2015 | Robb |
| 9,110,756 B1 | 8/2015 | Guo |
| 9,146,827 B2 | 9/2015 | Shimizu |
| 9,170,798 B2 | 10/2015 | Nagaraja |
| 9,262,193 B2 | 2/2016 | Hicks |
| 9,292,557 B2 | 3/2016 | Benari |
| 9,413,818 B2 | 8/2016 | Abuelsaad |
| 9,489,188 B1 * | 11/2016 | Guo ........................... G06F 8/65 |
| 9,646,284 B1 | 5/2017 | Lew |
| 9,714,962 B2 | 7/2017 | Albrecht |
| 9,767,452 B2 | 9/2017 | Khan |
| 10,003,514 B2 * | 6/2018 | Gibson .............. H04L 43/0876 |
| 10,078,619 B2 | 9/2018 | Apte et al. |
| 10,095,656 B2 | 10/2018 | Apte et al. |
| 2003/0078960 A1 | 4/2003 | Murren |
| 2003/0188291 A1 | 10/2003 | Fisher |
| 2004/0044985 A1 | 3/2004 | Kompalli |
| 2005/0044197 A1 | 2/2005 | Lai |
| 2005/0138650 A1 | 6/2005 | Hon |
| 2005/0204354 A1 | 9/2005 | Sundararajan |
| 2005/0235248 A1 | 10/2005 | Victoria |
| 2006/0106590 A1 | 5/2006 | Tseng |
| 2007/0006222 A1 | 1/2007 | Maier |
| 2007/0192493 A1 | 8/2007 | Manolache et al. |
| 2008/0005287 A1 | 1/2008 | Harvey |
| 2008/0098099 A1 | 4/2008 | Khasnis |
| 2008/0133594 A1 | 6/2008 | Fotinatos |
| 2008/0140760 A1 | 6/2008 | Conner |
| 2009/0125796 A1 | 5/2009 | Day |
| 2009/0228579 A1 | 9/2009 | Sanghvi |
| 2009/0282397 A1 | 11/2009 | Leporini et al. |
| 2010/0049766 A1 | 2/2010 | Sweeney |
| 2010/0083285 A1 | 4/2010 | Bahat |
| 2010/0132024 A1 | 5/2010 | Ben-Natan |
| 2010/0153941 A1 | 6/2010 | Borissov |
| 2011/0029963 A1 | 2/2011 | Smith |
| 2011/0119635 A1 | 5/2011 | Morales |
| 2011/0265164 A1 * | 10/2011 | Lucovsky ................. G06F 8/61 726/7 |
| 2012/0036440 A1 | 2/2012 | Dare et al. |
| 2012/0072560 A1 | 3/2012 | Gonzalez et al. |
| 2012/0117559 A1 | 5/2012 | Vorthmann |
| 2012/0226943 A1 | 9/2012 | Alderman et al. |
| 2012/0311012 A1 * | 12/2012 | Mazhar ............... H04L 41/5077 709/201 |
| 2013/0232463 A1 | 9/2013 | Nagaraja |
| 2013/0232480 A1 | 9/2013 | Winterfeldt |
| 2013/0232497 A1 | 9/2013 | Jalagam |
| 2013/0232498 A1 | 9/2013 | Mangtani |
| 2013/0291052 A1 | 10/2013 | Hadar et al. |
| 2013/0304616 A1 * | 11/2013 | Raleigh .................. G06Q 40/12 705/34 |
| 2014/0089782 A1 | 3/2014 | Cook |
| 2014/0095676 A1 | 4/2014 | Beno |
| 2014/0101300 A1 | 4/2014 | Rosensweig |
| 2014/0173578 A1 | 6/2014 | Ku |
| 2014/0372533 A1 | 12/2014 | Fu |
| 2015/0039770 A1 * | 2/2015 | Manglik ............. H04L 67/1097 709/226 |
| 2015/0088834 A1 | 3/2015 | Wright, Sr. |
| 2015/0208245 A1 | 7/2015 | Robinton |
| 2015/0319177 A1 | 11/2015 | Lietz |
| 2015/0378702 A1 | 12/2015 | Govindaraju |
| 2015/0378743 A1 | 12/2015 | Zellermayer |
| 2016/0019096 A1 | 1/2016 | Winterfeldt |
| 2016/0335161 A1 | 11/2016 | Toeroe |
| 2017/0039035 A1 | 2/2017 | Woodward |
| 2017/0302531 A1 * | 10/2017 | Maes ..................... H04L 67/10 |
| 2019/0034384 A1 | 1/2019 | Apte et al. |

OTHER PUBLICATIONS

Meier et al., "Chapter 5: Deployment Patterns," patterns & practices: Application Architecture Guide 2.0, Printed Aug. 15, 2014, 9 pages. apparchguide.codeplex.com/wikipage?title=Chapter%205% 20-%20Deployment%20Patterns.

List of IBM Patents or Patent Applications Treated as Related, Signed Feb. 21, 2020, 2 pages.

Deepal et al, Variations in Performance and Scalability when Migrating n-Tier Applications to Different Clouds, 2011, IEEE, pp. 73-80.

\* cited by examiner

DYNAMIC ASSOCIATION OF APPLICATION WORKLOAD TIERS TO INFRASTRUCTURE ELEMENTS IN A CLOUD COMPUTING ENVIRONMENT

CROSS-REFERENCE TO RELATED APPLICATIONS

This application is a Continuation of U.S. application Ser. No. 14/572,252, filed Dec. 16, 2014, the entirety of which is incorporated herein by reference.

BACKGROUND OF THE INVENTION

Field of the Invention

The present invention relates to multi-tier application computing in a cloud computing environment and more particularly to resource management for a multi-tier application operating in a cloud computing environment.

Description of the Related Art

A multi-tier application refers to a computer program developed for deployment across multiple layers of the computing infrastructure. In this regard, a multi-tier application logically separates the different application-specific, operational layers from its presentation and data layers. The number of layers varies by requirement, but a three-tier layering appears to be the most commonly used multi-tier application architecture. Thus, any application that depends upon or utilizes a middleware application is known as a multi-tier application. A multi-tier application is also known as a multi-tiered application or n-tier application.

As a consequence its multi-tier nature, each component of a multi-tier application may be separately developed and executed. Thereafter, each component is deployed into a manually determined layer of the multi-tier architecture. The layers typically configured to receive the deployment of a component include a presentation layer providing basic user interface and application access services, an application processing layer that includes the core business or application logic, a data access layer that provides the mechanism used to access and process data, and a data layer that physically holds and manages the data.

Application developers generally create patterns describing the structure of multi-tier applications. These patterns can be used by pattern engines in order to deploy the components of the multi-tier application into the desirable layers of the n-tier architecture. In particular, each layer can support one or more different virtual machines into which components are deployed according to the relevant patterns. Depending upon the layer, the virtual machines individually can include resources necessary to support components deployed therein such as a Web server, a load balancer, one or more application servers, and a database server.

Of note, security considerations require that different tiers of an n-tier application are deployed in distinct ways. For example, only an external-facing Web server and load balancer might have network connectivity to the public Internet, while all other servers might be isolated in separate networks with special firewall rules controlling network connections between the servers. The implication of these security requirements may require different tiers of the application to be deployed to wholly distinct infrastructure—different virtualization servers, using different networks, and using different storage servers.

Thus, the process of deploying components into an n-tier architecture can be manually intensive counter to the desire of the infrastructure administrator for a degree of automation. Having to manually associate virtual machines with infrastructure elements is both inefficient and error-prone, and can result in application failures and in security exposures.

BRIEF SUMMARY OF THE INVENTION

Embodiments of the present invention address deficiencies of the art in respect to deploying components of a multi-tier application and provide a novel and non-obvious method, system and computer program product for the dynamic association of components in a multi-tier application to different layers of a corresponding multi-tier application infrastructure. In an embodiment of the invention, a method for dynamically associating components in a multi-tier application to different layers of a corresponding multi-tier application infrastructure includes defining in memory of a host computing system a pattern that has an inventory of components of a multi-tier application. The method also includes associating each of the components with a corresponding tier label for an n-tier architecture. The method yet further includes loading the pattern into a pattern engine. Finally, the method includes deploying by the pattern engine each component of the pattern to a layer of the n-tier architecture corresponding to a tier label associated with the component.

In another embodiment of the invention, a method for dynamically associating components in a multi-tier application to different layers of a corresponding multi-tier application infrastructure includes loading into memory of a computer a pattern configured for processing by a pattern engine executing in the memory of the computer. The method also includes processing the pattern by the pattern engine to deploy individual components of the pattern to respective layers of an n-tier architecture corresponding to a tier label associated with each individual one of the components. In one aspect of the embodiment, the pattern engine deploys each of the individual components of the pattern to a virtual machine of a layer of the n-tier architecture corresponding to a tier label associated with each individual one of the components. In another aspect of the embodiment, the tier labels provide for a data tier and a Web tier. In yet another aspect of the embodiment, each individual one of the components is further associated within the pattern with a tag such that the pattern engine only deploys those of the components having an association with the tag.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dynamically associating components in a multi-tier application to different layers of a corresponding multi-tier application infrastructure. In accordance with an embodiment of the invention, a pattern can be created in memory to include an inventory of components of a multi-tier application. Each component can be associated in the pattern with a tier label corresponding to a tier of an n-tier infrastructure, for instance WEB_TIER or DATA_TIER or PUBLIC_INTERNET_TIER. Thereafter, the pattern can be loaded into a pattern engine and processed such that each component of the application is deployed into a layer of the n-tier infrastructure designated to correspond with a tier label associated with the component. In this way, the components of the pattern creator need not know the implementation details of the n-tier architecture beyond applying a generic tier label to each component of the application in order to effectively configure the multi-tier application for deployment into the n-tier architecture.

Figure 1:
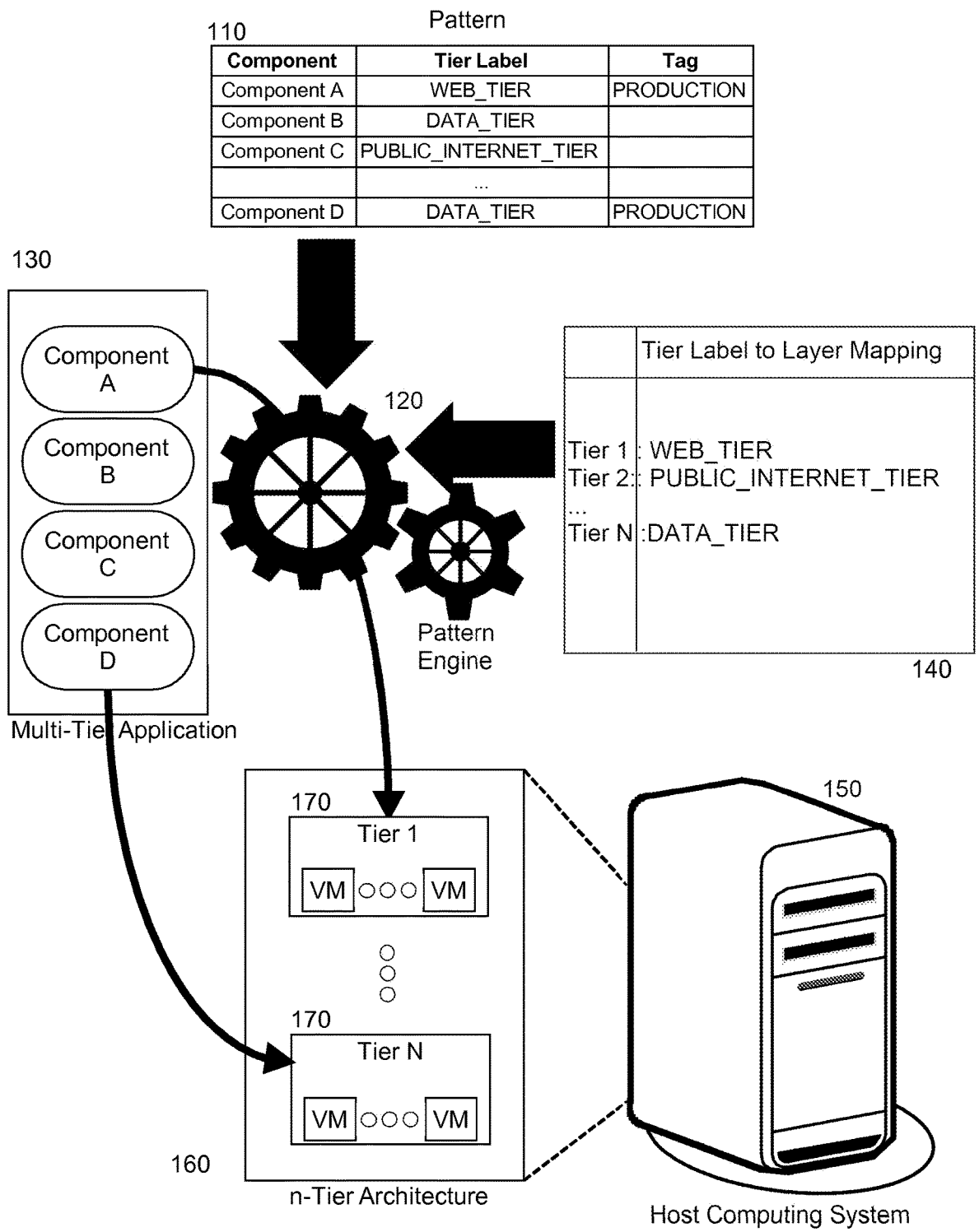
FIG. 1 is a pictorial illustration of a process for dynamically associating components in a multi-tier application to different layers of a corresponding multi-tier application infrastructure.

In further illustration, FIG. 1 pictorially shows a process for dynamically associating components in a multi-tier application to different layers of a corresponding multi-tier application infrastructure. As shown in FIG. 1, a pattern 110 can be generated to include an inventory of components of a multi-tier application 130. Each component in the inventory of the pattern 110 can be associated with a tier label, for example WEB_TIER, DATA_TIER, PUBLIC_INTERNET_TIER or other descriptive label. Optionally, a tag can be associated with one or more components as shown in FIG. 1.

A pattern engine 120 can process the pattern 110 to determine in which layer 170 of an n-tier architecture 160 of a host computing system 150 to deploy each component of the multi-tier application 130. In this regard, one or more virtual machines can be implemented in each of the layers 170 of the n-tier architecture into which different ones of the components of the multi-tier application 130 are to be deployed. The pattern engine 120 can map each tier label of a component of the pattern 110 to a mapping 140 particularly specifying an individual one of the layers 170 that corresponds to the tier label, and more particularly, an individual virtual machine of the specific one of the layers 170.

Consequently, the underlying structure of the n-tier architecture 160 can vary whilst the pattern 110 may remain static so long as the tier labels of the pattern 110 map to the specific layers 170 of the n-tier architecture 160 according to the mapping 140. Further, as an option, only those components of the multi-tier application 130 being associated with a particular tag are considered by the pattern engine 120 for deployment.

Figure 2:
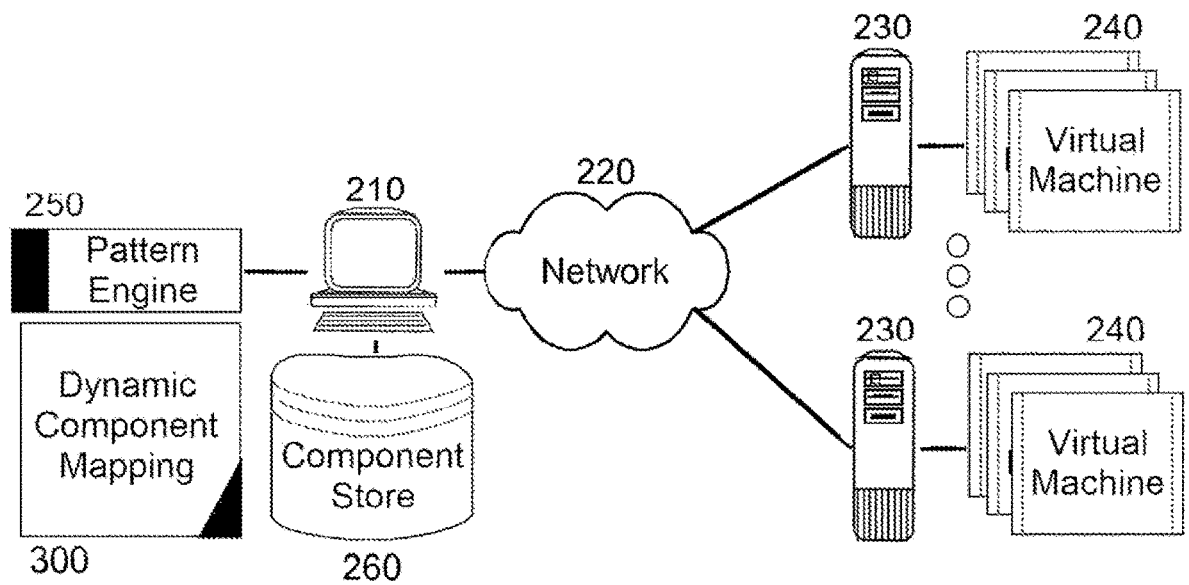
FIG. 2 is a schematic illustration of a data processing system configured for dynamically associating components in a multi-tier application to different layers of a corresponding multi-tier application infrastructure; and, FIG. 3 is a flow chart illustrating a process for dynamically associating components in a multi-tier application to different layers of a corresponding multi-tier application infrastructure.

The process described in connection with FIG. 1 can be implemented within a data processing system. In yet further illustration, FIG. 2 schematically shows a data processing system configured for dynamically associating components in a multi-tier application to different layers of a corresponding multi-tier application infrastructure. The system can include a host computing system 230 that can include one or more servers each with memory and at least one processor. The host computing system 230 further can support the operation of different virtual machines 240 of a virtualized environment such that different groupings of the virtual machines 240 can be accorded access to different computing resources commensurate with a particular layer of an n-tier architecture. Exemplary resources include network access, security, memory or disk space.

The host computing system 230 can be communicatively coupled to a computer 210 over computer communications network 220. The computer 210 can include at least one processor and memory and can be coupled to a component store 260 of components of a multi-tier application. The computer 210 also can support the operation of a pattern engine 250. Of note, a dynamic component mapping module 300 can be coupled to the pattern engine 250. In this regard, the dynamic component mapping module 300 can include program code that when executed in the memory of the computer 210 is enabled to process a pattern for the components of the component store 260 by dynamically identifying tier labels in the pattern for corresponding ones of the components, by mapping the tier labels to specific ones of the virtual machines 240, and by deploying each of the components to a particular one of the virtual machines 240 mapped to a tier label of a corresponding one of the components.

Figure 3:
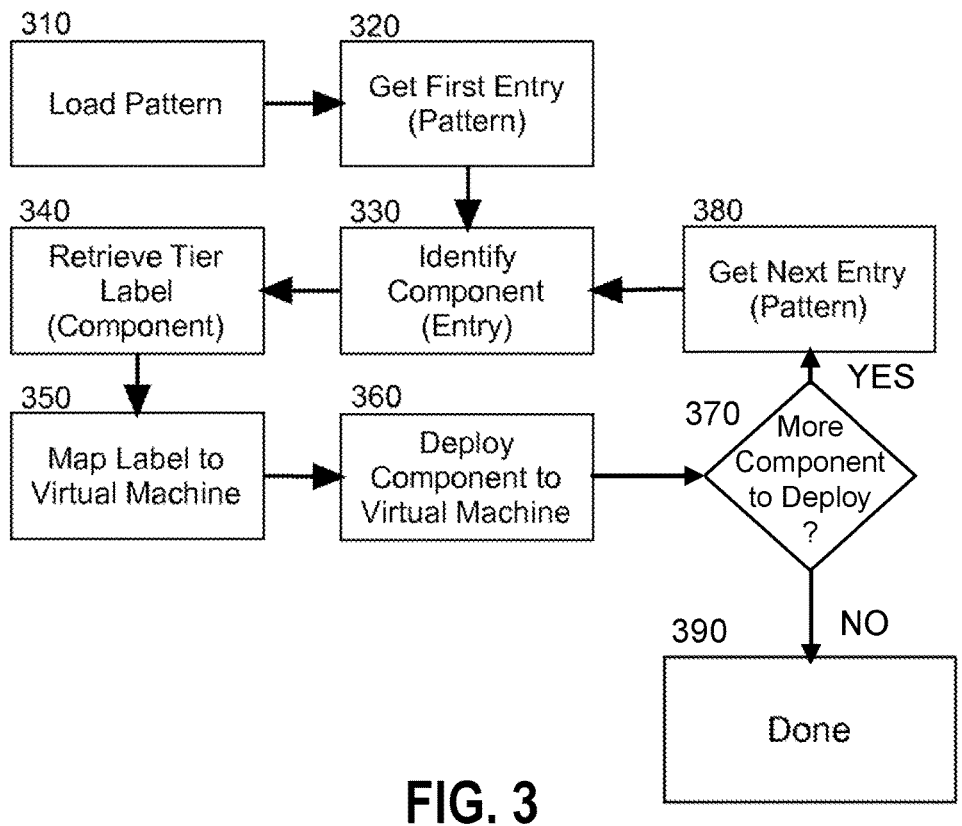

In even yet further illustration of the operation of the dynamic component mapping module 300, FIG. 3 is a flow chart illustrating a process for dynamically associating components in a multi-tier application to different layers of a corresponding multi-tier application infrastructure. Beginning in block 310, a pattern can be loaded for processing in the pattern engine. In block 320 a first entry in the pattern can be processed to identify an entry. In block 330, a component can be identified for the entry and in block 340, a tier label can be retrieve for the identified component. Thereafter, in block 350 the tier label can be mapped to a virtual machine in the n-tier infrastructure and in block 360 the identified component can be deployed to the mapped virtual machine. In decision block 370, if additional entries remain to be processed in the pattern, the process can return to block 380 in which a next entry of the pattern is retrieved for processing. Otherwise, the process can terminate in block 390.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer program product for dynamically associating components in a multi-tier application to different layers of a corresponding multi-tier application infrastructure, the computer program product comprising a non-transitory computer readable storage medium having program instructions embodied therewith, the program instructions executable by a device to cause the device to perform a method comprising:

defining, in memory of a host computing system, a pattern comprising a table of components, the table comprising a column of data fields, each data field identifying one of the components of the corresponding multi-tier application and a different column of different data fields, each different data field reflecting a corresponding virtual machine (VM) tier label referring to specific virtual machines of specific tiers of an n-tier architecture into which each identified one of the components associated with a corresponding component tier label is to be deployed and yet another column of further different fields, each of the further different fields identifying a tag for selected ones of the components, the tag comprising a textual reference to a grouping of components to be deployed together;

loading the pattern into a pattern engine; and deploying, by the pattern engine, each component of the pattern to one of a public Internet layer, a Web layer or a data layer of the n-tier architecture corresponding to the component tier label by loading a first one of the components in the table of the pattern, identifying a corresponding component tier label for the first one of the components and also a presence of a tag, and if the tag corresponds to a pre-specified tag, deploying the first one of the components but otherwise not deploying the first one of the components, and repeating the loading, identifying and deploying for each other one of the components in the table of the pattern.

2. The computer program of claim 1, wherein the pattern engine deploys each component of the pattern to a virtual machine of a layer of the n-tier architecture corresponding to the component tier label.

3. The computer program of claim 1, wherein both the component and the VM tier labels provide for a data tier and a Web tier.

4. A computer program product for dynamically associating components in a multi-tier application to different layers of a corresponding multi-tier application infrastructure, the computer program product comprising a non-transitory computer readable storage medium having program instructions embodied therewith, the program instructions executable by a device to cause the device to perform a method comprising:

loading the pattern into a pattern engine executing in the memory, the pattern comprising a table of the components, the table comprising the table comprising a column of data fields, each data field identifying one of the components of the corresponding multi-tier application and a different column of different data fields, each different data field reflecting a corresponding virtual machine (VM) tier label referring to specific virtual machines of specific tiers of an n-tier architecture into which each identified one of the components associated with a corresponding component tier label is to be deployed and yet another column of further different fields, each of the further different fields identifying a tag for selected ones of the components, the tag comprising a textual reference to a grouping of components to be deployed together; and deploying by the pattern engine each component of the pattern to one of a public Internet layer, a Web layer or a data layer of the n-tier architecture corresponding to the component tier label by loading a first one of the components in the table of the pattern, identifying a corresponding component tier label for the first one of the components and deploying the first one of the components and repeating the loading, identifying and deploying for each other one of the components in the table of the pattern.

5. The computer program product of claim 4, wherein the pattern engine deploys each of the individual components of the pattern to a virtual machine of a layer of the n-tier architecture corresponding to a respective said component tier label associated with each individual one of the components.

6. The computer program product of claim 4, wherein both the component and the VM tier labels provide for a data tier and a Web tier.

* * * * *